(12) United States Patent
Sato

(10) Patent No.: US 6,930,841 B2
(45) Date of Patent: Aug. 16, 2005

(54) SINGLE FOCUS LENS

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/803,887

(22) Filed: Mar. 19, 2004

(65) Prior Publication Data

US 2004/0190158 A1 Sep. 30, 2004

(30) Foreign Application Priority Data

Mar. 31, 2003 (JP) ........................................ 2003-094152

(51) Int. Cl.[7] .............................. G02B 9/12; G02B 9/00
(52) U.S. Cl. ...................................... 359/784; 359/740
(58) Field of Search .............................. 359/784, 785, 359/791, 792, 771, 763, 755, 756, 739, 740, 708

(56) References Cited

U.S. PATENT DOCUMENTS 6,414,802 B1    7/2002  Betensky
6,441,971 B2    8/2002  Ning

FOREIGN PATENT DOCUMENTS

JP       10-48516      2/1998
JP       2002-221659   8/2002

*Primary Examiner*—Georgia Epps
*Assistant Examiner*—Jack Dinh
(74) *Attorney, Agent, or Firm*—Arnold International; Jon W. Henry; Bruce Y. Arnold

(57) ABSTRACT

A single focus lens includes, in order from the object side: a glass first lens component of positive refractive power and with a convex surface on the object side; a diaphragm stop; a second lens component of plastic, a meniscus shape with its concave surface on the object side, and which includes at least one aspheric surface; and a third lens component of plastic, a meniscus shape with it convex surface on the object side, and which includes two aspheric surfaces. Each lens component may consist of a single lens element. Specified conditions are satisfied in order to reduce aberrations, to insure that the light rays at the image plane are substantially orthogonal to the image plane, and to insure that a sufficient back focus is provided so as to enable the insertion of other optical elements.

20 Claims, 3 Drawing Sheets

Spherical Aberration

Astigmatism

Distortion

Spherical Aberration

Astigmatism

Distortion

SINGLE FOCUS LENS

BACKGROUND OF THE INVENTION

In recent years, with the proliferation of personal computers into homes, digital still cameras (hereinafter referred to simply as digital cameras) that enable input of picture image information, such as photographed scenery, a portrait, or the like, into a personal computer are rapidly becoming more popular. Further, with the development of higher performance mobile cellular telephones, portable modular cameras for mounting in such cellular telephones and providing picture image input have also become more common.

An image pickup element, such as a CCD (Charge Coupled Device) or a CMOS (Complementary Metal Oxide Semiconductor), is used in these cameras. Advancements in the miniaturization of camera elements in recent years have allowed these cameras to be designed, as a whole, to be extremely miniaturized. Further, advancements in achieving a larger number of pixels in the same size image pickup element have required the development of higher optical performance from the lens used to form images onto such a higher resolution, image pickup element.

Japanese Laid-Open Patent Application H10-48516, Japanese Laid-Open Patent Application 2002-221659, and U.S. Pat. No. 6,441,971 describe exemplary imaging lenses for such cameras that include only three lens elements. Additionally, Japanese Laid-Open Patent Application 2002-517773 describes an imaging lens that includes only four lens elements. In the imaging lens described in Japanese Laid-Open Patent Application H10-48516, the stop is positioned between the second and third lens elements, in order from the object side. In the imaging lenses described in Japanese Laid-Open Patent Applications 2002-221659 and 2002-517773, the stop is positioned between the first and second lens elements in order from the object side. In the imaging lens described in U.S. Pat. No. 6,441,971, the stop is positioned on the object side of the first lens element in order from the object side. All of the imaging lenses described in the four patent documents discussed above have a lens element with a meniscus shape at the extreme object side of the imaging lens.

Advances in miniaturization and the ongoing trend of larger numbers of pixels in image pickup elements will increase the need for higher resolution and yet more compact imaging lenses, especially imaging lenses for digital cameras. Although in the past cost and compactness were the primary requirements for the imaging lens of a portable modular camera, as advancements continue in providing larger numbers of pixels in an image pickup element for use in portable modular cameras, the demand for improvement of optical performance has recently increased. More particularly, the next generation of portable modular cameras are expected to provide even higher optical performance with a larger number of pixels.

Accordingly, the development of a wide variety of imaging lenses based on a comprehensive consideration of cost, performance and compactness is required. The development of an imaging lens that is low in cost and which also has high performance is required, while satisfying the requirements of compactness that enable mounting the imaging lens in, for example, a portable modular camera. In addition, ample consideration must be given to optical performance so as to enable the imaging lens to be used in the next generation of portable modular cameras.

In response to such demands, a three-lens or a four-lens construction may be used in order to satisfy the requirements of compactness and low cost, and consideration can be given to the aggressive use of aspheric surfaces in order to achieve higher performance. In this case, an aspheric surface contributes to the compactness and higher performance. However, because the use of aspheric surfaces is disadvantageous from the manufacturing point of view and it may easily increase cost, sufficient consideration should be given to manufacturing issues before a particular design using aspheric surfaces is approved for mass production.

The imaging lens described in each of the patent documents discussed above includes aspheric surfaces in a three-lens-element construction or a four-lens-element construction. However, in order to achieve favorable optical performance, the compactness of the imaging lens becomes unfavorable. Generally, with an imaging lens having a three-lens-element construction, even if there is adequate optical performance for a portable modular camera, the performance is inadequate for use in the next generation of portable modular cameras or in digital cameras. Additionally, with an imaging lens having a four-lens construction, although the optical performance can be improved over a three-lens construction, the cost and size of the imaging lens increase.

BRIEF SUMMARY OF THE INVENTION

The present invention relates to a single focus lens that can be compact, uses a small number of lens components and lens elements, can be manufactured at low cost, and can achieve high optical performance by particular use of aspheric lens surfaces. The present invention relates particularly to such a single focus lens that can be mounted in small image capturing devices.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
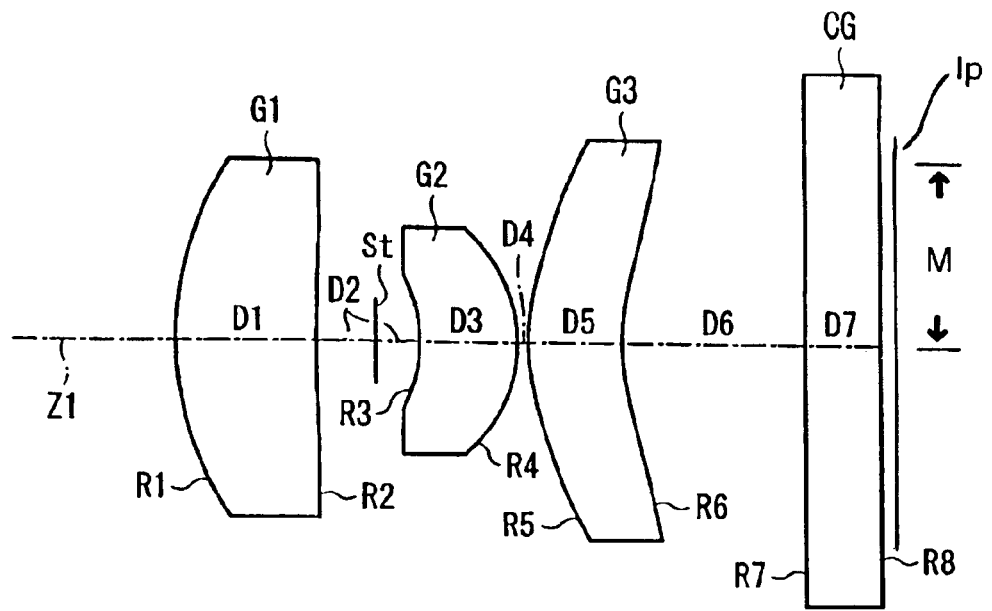
FIG. 1 shows a cross-sectional view of the single focus lens according to Embodiment 1.

A general description of preferred embodiments of the single focus lens of the present invention will now be described with reference to FIG. 1. FIG. 1 shows a cross-sectional view of the single focus lens of Embodiment 1. In FIG. 1, the lens elements of the single focus lens are referenced by the symbols G1, G2, and G3, in order from the object side of the single focus lens along the optical axis Z1. Additionally, a cover glass on the image side of the third lens element G3 is referenced by the symbol CG. The radii of curvature of the lens elements G1 to G3 and the cover glass CG are referenced by the letter R followed by a number denoting their order from the object side of the single focus lens, from R1 to R8. The on-axis surface spacings along the optical axis Z1 between the surfaces of the optical elements are referenced by the letter D followed by a number denoting their order from the object side of the single focus lens, from D1 to D7. In FIG. 1, the image plane referenced by the symbol Ip is shown on the image side of the cover glass CG. The maximum image height at the image plane is indicated by the symbol M in FIG. 1. The single focus lens further includes a diaphragm stop St between the first lens element G1 and the second lens element G2 that operates as an aperture stop.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the single focus lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The single focus lens of the present invention can be used, for example, in a digital camera or a portable modular camera that uses an image pickup element such as a CCD or CMOS. As shown in FIG. 1, the single focus lens includes, arranged in order from the object side along the optical axis Z1, a first lens element G1, a diaphragm stop St, a second lens element G2, and a third lens element G3. An image pickup element, such as a CCD (not shown in the drawings) is arranged at the image plane of the single focus lens. A cover glass CG is arranged at or adjacent the image plane so as to protect the image-detecting elements of the CCD. In addition to the cover glass CG, other optical elements such as an infrared cut-off filter and/or a low-pass filter may also be arranged between the third lens element G3 and the image plane.

The first lens element G1 of positive refractive power has a convex surface on the object side and is made of glass. The first lens element G1 may have a meniscus shape or may have a plano-convex shape with the image-side surface being planar. The second lens element G2 is made of plastic, has at least one surface that is aspheric, has a meniscus shape with a concave surface on the object side and may have either positive or negative refractive power. Furthermore, preferably both surfaces of the lens element G2 are aspheric in order to favorably correct aberrations more easily.

The third lens element G3 has a meniscus shape and an aspheric surface on each side with a convex surface on the object side. The third lens element G3 is made of plastic and may have positive or negative refractive power. The third lens element G3 has an aspheric shape with little change in lens thickness from the optical axis Z1 toward the periphery of the third lens element so that Conditions (3) and (4), which will be discussed later, are satisfied.

The lens surfaces that are aspheric are defined using the following equation:

$$Z=[(CY^2)/\{1+(1-K \cdot C^2 \cdot Y^2)^{1/2}\}]+\Sigma(A_i \cdot |Y^i|) \qquad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends over i.

In the embodiments of the invention disclosed below, aspheric coefficients other than $A_3$–$A_{10}$ are zero and for some lens surfaces only even-numbered aspheric coefficients of the aspheric coefficients $A_3$–$A_{10}$ are non-zero. More specifically, in the disclosed embodiments, the aspheric shapes of both surfaces of the second lens element G2 are expressed by using non-zero, even-numbered aspheric coefficients $A_4$, $A_6$, $A_8$, and $A_{10}$. Also, the aspheric shapes of both surfaces of the third lens element G3 are expressed by using non-zero, aspheric coefficients $A_3$–$A_{10}$.

The single focus lens of the present invention satisfies the following Condition (1):

$$1.0 < f1/f < 2.5 \qquad \text{Condition (1)}$$

where f1 is the focal length of the first lens element G1, and f is the focal length of the single focus lens.

If the ratio of Condition (1) is larger than the upper limit of Condition (1), the refractive power of the first lens element G1 becomes too small, making correction of the distortion aberration difficult. Additionally, it is generally preferred with a digital camera or similar imaging device that uses an image pickup element such as a CCD that the optical path of the light rays be orthogonal or nearly orthogonal to the image plane, defining a telecentric state on the image side. If the ratio of Condition (1) is smaller than the lower limit of Condition (1), the incident angle of light rays onto the detecting surfaces of the image detector at the image plane becomes undesirably large, failing to satisfy the requirements of orthogonality and telecentricity.

Preferably, the single focus lens also satisfies the following Condition (2):

$$R1/f < 3.0 \qquad \text{Condition (2)}$$

where

R1 is the radius of curvature of the object-side surface of the first lens element G1, and f is as defined above.

If Condition (2) is not satisfied, the correction of aberrations, particularly distortion aberration and astigmatism, becomes difficult.

Additionally, the single focus lens preferably satisfies the following Conditions (3) and (4):

$$1.0 < \Delta ZF/\Delta ZR < 2.0 \qquad \text{Condition (3)}$$

$$0.3 < \Delta ZRA/\Delta ZR < 0.6 \qquad \text{Condition (4)}$$

where $\Delta ZF$ is the object-side shape displacement at the maximum height at which an image forming light ray passes through the image-side surface of the third lens element G3, $\Delta ZR$ is the image-side shape displacement at the maximum height at which an image forming light ray passes through the image-side surface of the third lens element G3, and $\Delta ZRA$ is the image-side shape displacement at one-half the maximum height at which an image forming light ray passes through the image-side surface of the third lens element G3.

Figure 3:
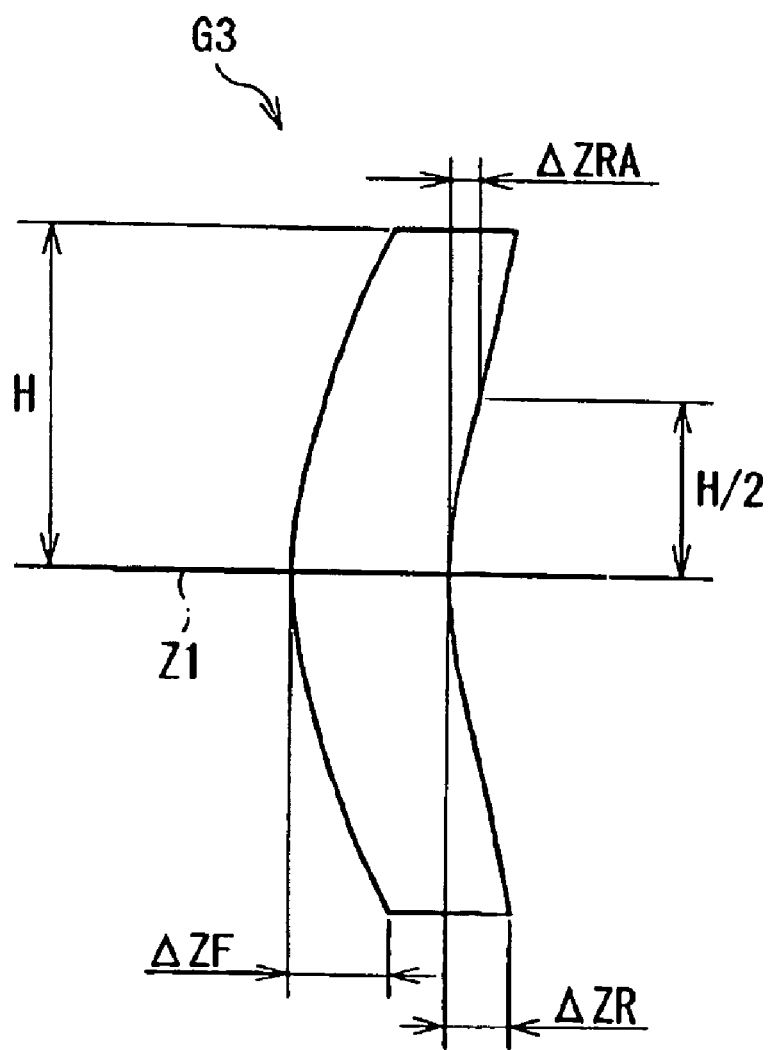
FIG. 3 shows a cross-sectional view of a third lens element according to the present invention with various heights and shape displacements indicated.

The term "shape displacement" is herein defined as follows with reference to FIG. 3 that shows a cross-sectional view of the third lens element G3 with various heights and shape displacements indicated. As shown in FIG. 3, shape displacement is defined as the distance in the direction of the optical axis from a plane perpendicular to the optical axis that passes through the vertex of the lens element on the optical axis, a plane passing through the object-side vertex for an "object-side shape displacement" and a plane passing through the image-side vertex for an "image-side shape displacement," to the object-side surface of the lens element for an object-side shape displacement and to the image-side surface of the lens element for an image-side shape displacement. The maximum height at which an image forming light ray passes through the image-side surface of the third lens element G3 is designated as dimension H in FIG. 3, and, as shown in FIG. 3, the height is measured perpendicular to the optical axis Z1.

When Conditions (3) and (4) are not satisfied, the optical performance of the single focus lens deteriorates quickly based on the temperature dependent properties of the third lens element G3 because the third lens element G3 is made of plastic. Additionally, when Conditions (3) and (4) are not satisfied, the uniformity of the thickness of the third lens element G3 decreases, making the lens element more difficult to manufacture. Additionally, by using an aspheric surface in each of the second lens element G2 and the third lens element G3, significant aberration correction can be achieved, and that correction, especially correction of on-axis aberrations, is made easier by the third lens element G3 including an aspheric surface and Conditions (3) and (4) being satisfied.

Also, preferably the single focus lens satisfies the following condition:

$$0.7 < (Bf - \Delta ZR)/M \qquad \text{Condition (5)}$$

where

Bf is the back focal length of the single focus lens based on air being between the image-side surface of the single focus lens and the image plane, $\Delta ZR$ is as defined above, and M is the maximum image height at the image plane Ip, as discussed previously with reference to FIG. 1.

Generally, with an optical system that uses an image pickup element, it is common for an optical element, such as an infrared cut-off filter or a cover glass, to be placed between the image-side lens element and the image plane. Therefore, an adequate back focus distance to make room for these optical elements is necessary. If Condition (5) is not satisfied, the third lens element G3 becomes too close to the image plane, not leaving enough room for these optical elements.

Additionally, preferably the single focus lens satisfies the following condition:

$$0.6 < (|R2| - R1)/(R1 + |R2|) \qquad \text{Condition (6)}$$

where

R1 is the radius of curvature of the object-side surface of the first lens element G1, and R2 is the radius of curvature of the image-side surface of the first lens element G1.

If Condition (6) is not satisfied, the correction of aberrations, particularly distortion aberration, becomes difficult.

Ease of manufacturing and low cost are primary considerations in the construction of the first lens element G1. Glass is the preferred material of the first lens element GI and spherical is the preferred shape, particularly glass that can be ground and polished to a desired spherical shape. Additionally, if the first lens element G1 is a plano-convex lens element, manufacturing costs can be reduced and reliability in the quality of the lens elements produced can be improved. On the other hand, the second lens element G2 and the third lens element G3 are preferably made of an optical resin material, i.e., plastic suitable for lenses, that is formed into the desired aspheric shapes.

Placing the stop St between the first lens element G1 and the second lens element G2 improves the optical performance near the optical axis.

A single focus lens constructed as described above may include a small number of lens elements, be compact enough for a portable modular camera, and be produced at a low cost. Additionally, by using aspheric surfaces and by satisfying various conditions as described above, a single focus lens may also achieve a high optical performance that is suitable for the next generation of portable modular cameras.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

EMBODIMENT 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f, the f-number $F_{NO}$, and the maximum field angle $2\omega$.

TABLE 1

| # | R | D | $N_d$ | $v_d$ |
|---|---|---|---|---|
| 1 | 2.9263 | 1.30 | 1.48749 | 70.4 |
| 2 | 27.7528 | 0.95 | | |
| 3* | −1.3101 | 0.90 | 1.50869 | 56.0 |
| 4* | −1.3128 | 0.10 | | |
| 5* | 1.9280 | 0.85 | 1.50869 | 56.0 |
| 6* | 2.1980 | 1.71 | | |
| 7 | ∞ | 0.70 | 1.51680 | 64.2 |
| 8 | ∞ | | | |
| | f = 3.93 mm | $F_{NO}$ = 4.0 | $2\omega$ = 66.7° | |

TABLE 1-continued

| # | R | D | $N_d$ | $v_d$ |
|---|---|---|---|---|

The surfaces with a * to the right of the surface number in Table 1 are aspheric lens surfaces, and the aspheric surface shape is expressed by Equation (A) above.

Table 2 below lists the values of the constants K, and $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 3 | -5.4807 | 0 | -2.8445E-1 | 0 | 1.1775E-1 |
| 4 | -1.7374 | 0 | -1.8745E-1 | 0 | 1.0618E-1 |
| 5 | -8.4898 | 3.7926E-3 | 2.8421E-2 | -2.8333E-2 | -1.2320E-3 |
| 6 | -0.9217 | 4.3276E-2 | -1.3535E-1 | 2.6563E-2 | 3.7721E-2 |

| # | $A_7$ | $A_8$ | $A_9$ | $A_{10}$ |
|---|---|---|---|---|
| 3 | 0 | 7.5968E-3 | 0 | 5.8657E-3 |
| 4 | 0 | -6.2715E-2 | 0 | 1.7418E-2 |
| 5 | 1.1369E-2 | 0.0001 | -3.1926E-3 | 7.6681E-4 |
| 6 | -1.4707E-2 | -0.0072 | 5.8518E-3 | -1.0870E-3 |

The single focus lens of Embodiment 1 satisfies Conditions (1)–(6) above, as set forth in Table 3 below.

TABLE 3

| Condition No. | Condition | Value |
|---|---|---|
| (1) | 1.0 < f1/f < 2.5 | 1.68 |
| (2) | R1/f < 3.0 | 0.74 |
| (3) | 1.0 < ΔZF/ΔZR < 2.0 | 1.55 |
| (4) | 0.3 < ΔZRA/ΔZR < 0.6 | 0.43 |
| (5) | 0.7 < (Bf − ΔZR)/M | 0.75 (M = 2.435) |
| (6) | 0.6 < (\|R2\| − R1)/(R1 + \|R2\|) | 0.81 |

Figure 4A:
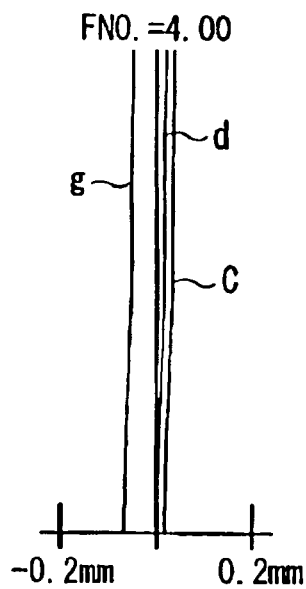
FIGS. 4A–4C show the spherical aberration, astigmatism, and distortion, respectively, of the single focus lens according to Embodiment 1.
Figure 4B:
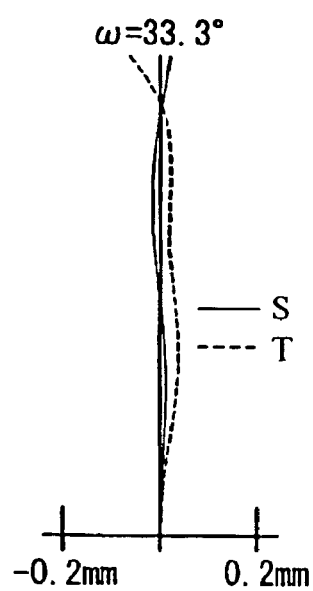
Figure 4C:
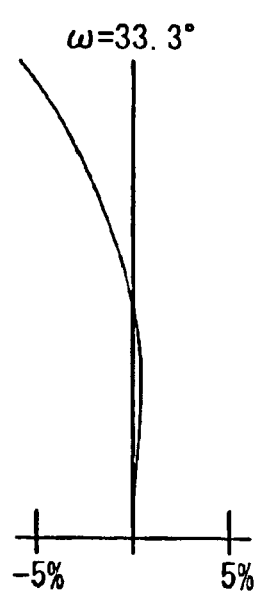

FIGS. 4A–4C show the spherical aberration, astigmatism, and distortion, respectively, of the single focus lens according to Embodiment 1. In FIG. 4A, the spherical aberration is shown for the d-line (λ=587.6 nm), the g-line (λ=435.8 nm), and the C-line (λ=656.3 nm). As shown in FIG. 4A, the f-number is 4.00. In FIG. 4B, the astigmatism is shown at the d-line (λ=587.6 nm) for both the sagittal image surface S and the tangential image surface T. In FIG. 4C, the distortion is shown at the d-line (λ=587.6 nm). The half-field angle ω for FIGS. 4B and 4C is 33.3°.

As is clear from the lens data and aberration curves discussed above, in Embodiment 1 the various aberrations are favorably corrected, and performance capabilities that are suitable for a compact single focus lens can be obtained.

EMBODIMENT 2

Figure 2:
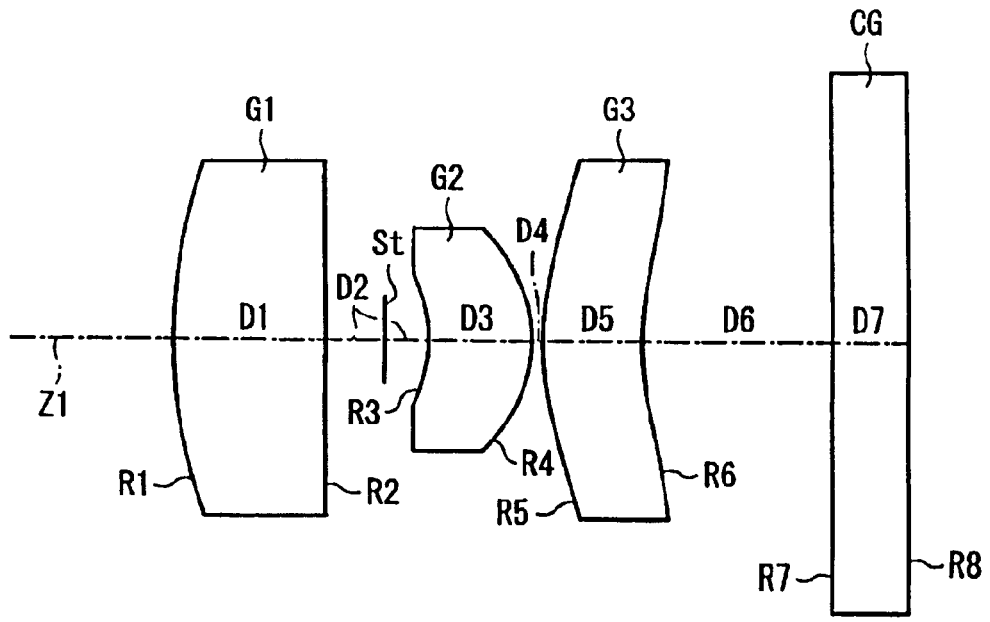
FIG. 2 shows a cross-sectional view of the single focus lens according to Embodiment 2.

FIG. 2 shows Embodiment 2 of the present invention. Table 4 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2. Listed in the bottom portion of Table 4 are the focal length f, the f-number $F_{NO}$, and the maximum field angle 2ω.

TABLE 4

| # | R | D | $N_d$ | $v_d$ |
|---|---|---|---|---|
| 1 | 4.8488 | 1.40 | 1.75500 | 52.3 |
| 2 | 0.0000 | 0.95 | | |
| 3* | -1.2963 | 0.95 | 1.50869 | 56.0 |
| 4* | -1.2674 | 0.10 | | |
| 5* | 2.3167 | 0.90 | 1.50869 | 56.0 |
| 6* | 2.5822 | 1.76 | | |
| 7 | ∞ | 0.70 | 1.51680 | 64.2 |
| 8 | ∞ | | | | f = 3.90 mm   $F_{NO}$ = 4.0   2ω = 62.9°

The surfaces with a * to the right of the surface number in Table 4 are aspheric lens surfaces, and the aspheric surface shape is expressed by Equation (A) above.

Table 5 below lists the values of the constants K, and $A_3$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_3$ | $A_4$ | $A_5$ | $A_6$ |
|---|---|---|---|---|---|
| 3 | -5.2422 | 0 | -2.5359E-1 | 0 | 1.3639E-1 |
| 4 | -2.0855 | 0 | -1.8248E-1 | 0 | 1.0853E-1 |
| 5 | -8.7908 | -3.7537E-4 | 1.7103E-2 | -3.5433E-2 | 1.0342E-2 |
| 6 | -9.2172 | 4.3276E-2 | -1.3535E-1 | 2.6563E-2 | 3.7721E-2 |

| # | $A_7$ | $A_8$ | $A_9$ | $A_{10}$ |
|---|---|---|---|---|
| 3 | 0 | 9.1987E-3 | 0 | 5.9263E-3 |
| 4 | 0 | -6.3243E-2 | 0 | 1.6721E-2 |
| 5 | 1.1794E-2 | -3.4430E-3 | -3.2831E-3 | 1.1883E-3 |
| 6 | -1.4707E-2 | -7.1996E-3 | 5.8518E-3 | -1.0870E-3 |

The single focus lens of Embodiment 2 satisfies Conditions (1)–(6) above, as set forth in Table 6 below.

TABLE 6

| Condition No. | Condition | Value |
|---|---|---|
| (1) | 1.0 < f1/f < 2.5 | 1.65 |
| (2) | R1/f < 3.0 | 1.24 |
| (3) | 1.0 < ΔZF/ΔZR < 2.0 | 1.37 |
| (4) | 0.3 < ΔZRA/ΔZR < 0.6 | 0.44 |
| (5) | 0.7 < (Bf − ΔZR)/M | 0.82 (M = 2.435) |
| (6) | 0.6 < (\|R2\| − R1)/(R1 + \|R2\|) | 1.00 |

Figure 5A:
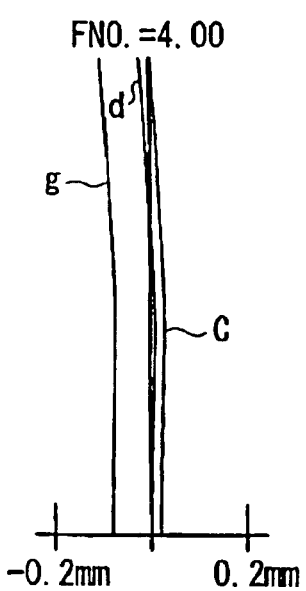
FIGS. 5A–5C show the spherical aberration, astigmatism, and distortion, respectively, of the single focus lens according to Embodiment 2.
Figure 5B:
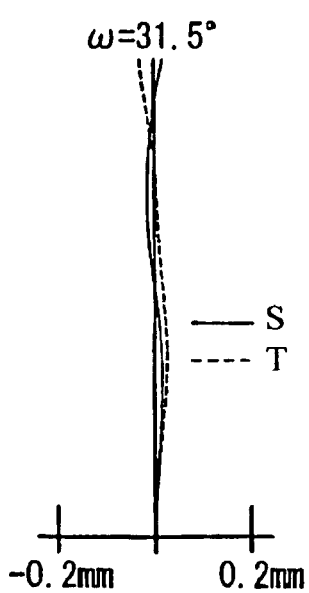
Figure 5C:
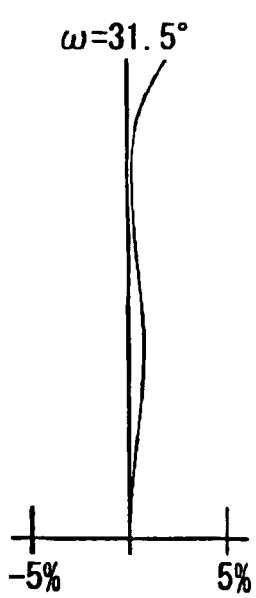

FIGS. 5A–5C show the spherical aberration, astigmatism, and distortion, respectively, of the single focus lens according to Embodiment 2. In FIG. 5A, the spherical aberration is shown for the d-line (λ=587.6 nm), the g-line (μ=435.8 nm), and the C-line (λ=656.3 nm). As shown in FIG. 5A, the f-number is 4.00. In FIG. 5B, the astigmatism is shown at the d-line (λ=587.6 nm) for both the sagittal image surface S and the tangential image surface T. In FIG. 5C, the distortion is shown at the d-line (λ=587.6 nm). The half-field angle ω for FIGS. 5B and 5C is 31.5°.

As is clear from the lens data and aberration curves discussed above, in Embodiment 2 the various aberrations are favorably corrected, and performance capabilities that are suitable for a compact single focus lens can be obtained.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens comprising, arranged along an optical axis in order from the object side:
   a first lens component having positive refractive power, having a convex object-side surface, and being made of glass;
   a stop;
   a second lens component having a meniscus shape with a concave object-side surface, being made of plastic, and having at least one aspheric surface;
   a third lens component having a meniscus shape with a convex object-side surface, being made of plastic, and each of the object-side surface and the image-side surface being aspheric;
wherein
the following conditions are satisfied:

$1.0 < f1/f < 2.5$ $R1/f < 3.0$ $1.0 < \Delta ZF/\Delta ZR < 2.0$ $0.3 < \Delta ZRA/\Delta ZR < 0.6$ $0.7 < (Bf - \Delta ZR)/M$ $0.6 < (|R2| - R1)/(R1 + |R2|)$ where
   f1 is the focal length of the first lens component,
   f is the focal length of the single focus lens,
   R1 is the radius of curvature of the object-side surface of the first lens component,
   $\Delta ZF$ is the object-side shape displacement at the maximum height at which an image forming light ray passes through the image-side surface of the third lens component,
   $\Delta ZR$ is the image-side shape displacement at the maximum height at which an image forming light ray passes through the image-side surface of the third lens component,
   $\Delta ZRA$ is the image-side shape displacement at one-half the maximum height at which an image forming light ray passes through the image-side surface of the third lens component,
   Bf is the back focal length of the single focus lens based on air being between the image-side surface of the single focus lens and the image plane,
   M is the maximum image height at the image plane, and
   R2 is the radius of curvature of the image-side surface of the first lens component.

2. The single focus lens of claim 1, wherein the first lens component is a lens element.

3. The single focus lens of claim 2, wherein the second lens component is a lens element.

4. The single focus lens of claim 3, wherein the third lens component is a lens element.

5. The single focus lens of claim 1, wherein the first lens component, the second lens component, and the third lens component are arranged in that order along the optical axis from the object side without any intervening lens element.

6. The single focus lens of claim 5, wherein each of the first, second, and third lens components consists of a lens element.

7. The single focus lens of claim 1, wherein the single focus lens is formed of only three lens components.

8. The single focus lens of claim 7, wherein the first lens component is a lens element.

9. The single focus lens of claim 8, wherein the second lens component is a lens element.

10. The single focus lens of claim 9, wherein the third lens component is a lens element.

11. The single focus lens of claim 1, wherein the first lens component is plano-convex in shape with the planar surface on the image side and each of the object-side surface and the image-side surface of the second lens component is aspheric.

12. The single focus lens of claim 11, wherein the first lens component is a lens element.

13. The single focus lens of claim 12, wherein the second lens component is a lens element.

14. The single focus lens of claim 13, wherein the third lens component is a lens element.

15. The single focus lens of claim 11, wherein the first lens component, the second lens component, and the third lens component are arranged in that order along the optical axis from the object side without any intervening lens element.

16. The single focus lens of claim 15, wherein each of the first, second, and third lens components consists of a lens element.

17. The single focus lens of claim 11, wherein the single focus lens is formed of only three lens components.

18. The single focus lens of claim 17, wherein the first lens component is a lens element.

19. The single focus lens of claim 18, wherein the second lens component is a lens element.

20. The single focus lens of claim 19, wherein the third lens component is a lens element.

* * * * *